Patented Dec. 15, 1942

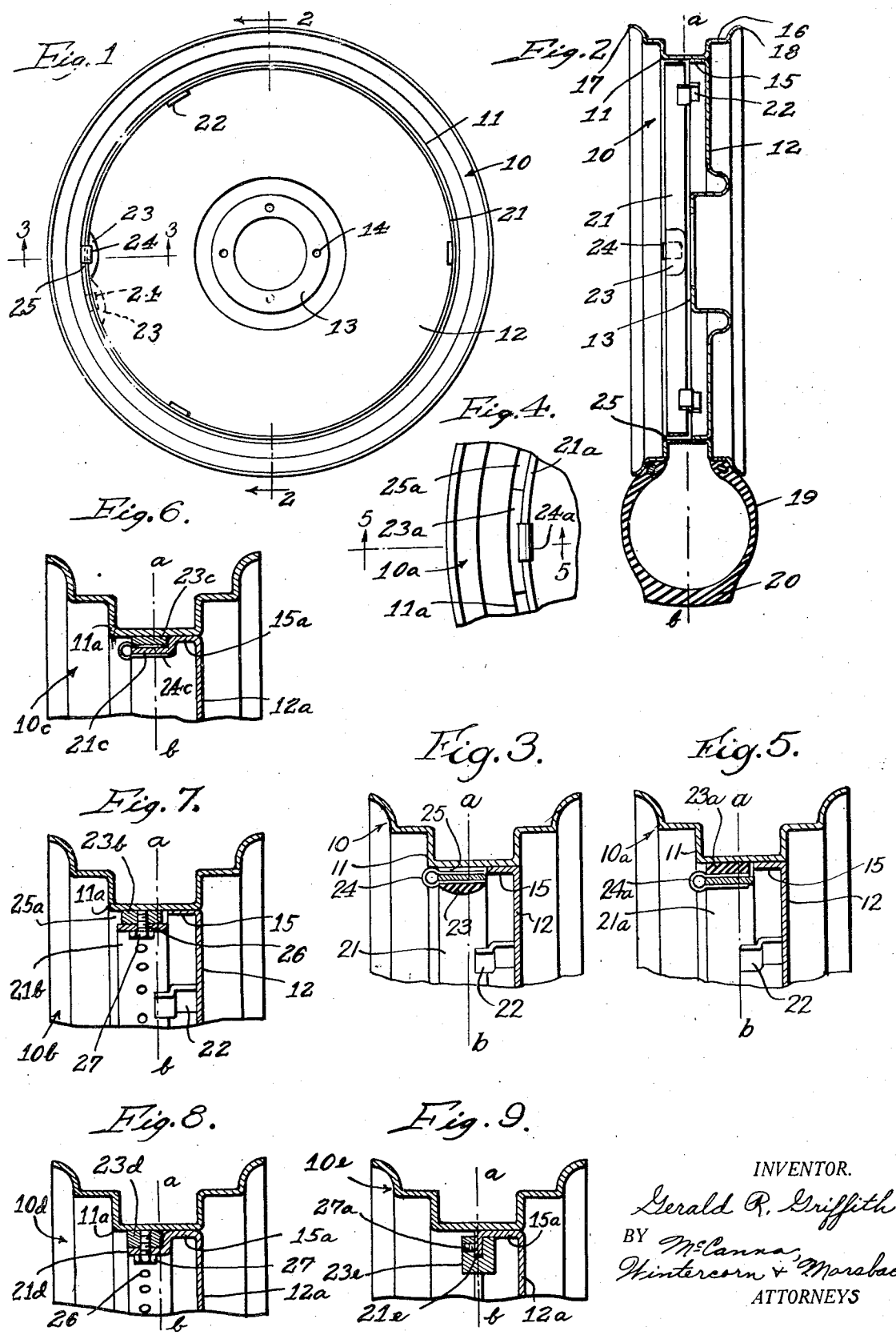

2,304,816

UNITED STATES PATENT OFFICE 2,304,816

VEHICLE WHEEL BALANCING MEANS

Gerald R. Griffith, Rockford, Ill.

Application January 27, 1941, Serial No. 376,141

14 Claims. (Cl. 301—5)

This invention relates to balancing means for the wheels of automobiles and other vehicles.

At present the most widely used method of balancing automobile wheels involves the attachment of lead lugs to the outside of the wheel rim to compensate for the out of balance condition usually attributable to the larger and heavier tires and tubes being used. These lugs are objectionable from the standpoint of appearance and because of the danger of being lost, bringing back the out of balance condition and resulting in excessive tire wear before the loss is discovered, there being a further danger at high speeds of the lugs being thrown off through the fenders and causing expensive damage and possible injury. Furthermore, due to the fact that the static balance lead lugs were applied to the rim flange at an appreciable distance from the plane through the middle of the tire tread, dynamic balancing has also been required, involving the application of additional lugs on the other side of the wheel. Such counterweighting to establish correct static and dynamic balance frequently involves the application of as many as five or six lugs, whereas only one or perhaps two weights applied at the proper point in or near the plane through the middle of the tire tread would obtain the desired results. That is to say, static balancing would not disturb the dynamic balance.

It is, therefore, the principal object of my invention to provide balancing means in the form of a ring or flange in concentric relation to and radially spaced inwardly from the felly of the wheel to mount static balance weights thereon substantially in the plane through the middle of the tire tread. This ring or flange being concealed behind the disk or spoked central portion of the wheel does not change or detract from the appearance of the wheel and, furthermore, is better adapted for the safe mounting of the weights than the rim flange, inasmuch as the weights may be inserted snugly between the ring or flange and the felly and suitably secured in place, or they may be applied to the ring or flange by clips which enter snugly between the felly and the ring or flange. Rings are easily applicable to existing wheels, but flanges may be provided as integral portions of the wheel, as will soon appear.

The invention is illustrated in the accompanying drawing, in which—

Figure 1 is an inner side view of an automobile wheel equipped with wheel balancing means in accordance with my invention;

Fig. 2 is a cross-section on the line 2—2 of Fig. 1, indicating the position of the tire thereon in relation to the balancing means.

Fig. 3 is a sectional detail on a larger scale on the line 3—3 of Fig. 1;

Fig. 4 is a fragmentary side elevational view corresponding to a portion of Fig. 1, showing a different method of applying the balancing weights;

Fig. 5 is a sectional detail similar to Fig. 3 taken on the line 5—5 of Fig. 4;

Fig. 6 is a fragmentary sectional view similar to Figs. 3 and 5 but showing an integral circular flange in place of the ring;

Figs. 7 and 8 are fragmentary sectional views similar to Figs. 3 and 5, but illustrating in Fig. 7 the use of a perforated ring and in Fig. 8 the provision of an integral circular flange, similarly as in Fig. 6 but perforated for application of weights in the same manner as in Fig. 7, and Fig. 9 is a fragmentary sectional view similar to Figs. 6 and 8 but showing a further modification.

Similar reference numerals are applied to corresponding parts throughout the views.

Referring first to Figs. 1 to 3, the reference numeral 10 designates the rim of an automobile wheel of the drop center type, as indicated by the felly 11. The disk 12 of the wheel has the conventional attaching flange 13 on the center portion thereof in which there are holes provided, as indicated at 14, to receive the studs on the companion flange on the hub onto which the wheel is adapted to be mounted in the usual way. The inturned flange 15 on the outer periphery of the disk 12 is welded or otherwise secured to the felly portion of the rim 16. At 17 and 18 are indicated the flanges on the rim between which the tire 19 is retained in the usual way. 20 indicates the tread portion of the tire. The inner tube is not shown.

The center line a—b designates the plane through the middle of the tire tread 20. When under the old practice lead lugs were attached to one of the rim flanges 17 and 18 to obtain correct static balance, the moment attributable to the spacing of such weights from the plane a—b when the wheel was rotated at high speed necessitated the application of additional lead lugs to the rim flange on the other side of the wheel to compensate for this moment to avoid shimmy or wobble of the wheel. That method, therefore, took too much time and the results obtained were not satisfactory, because aside from the difficulty of obtaining closely accurate balancing, it involved the necessity of applying as many as five or six weights to a wheel, whereas only one or two weights applied to the rim 16 at the proper point in or near the plane a—b would obtain the desired results. Furthermore, the rim flanges 17 and 18 do not afford secure anchorage for these lugs and, aside from the objection that lugs applied to the outer flange 18 detract from the appearance of the wheel, there is the worse objection that the lugs are apt to be lost without the motorist's knowledge, thus restoring the out of balance condition and causing excessive and expensive tire wear before the loss is discovered, and if a lug is thrown off when the wheel is turning at high speed, there is also the danger of its going through the fender and causing further expense and possible injury.

In accordance with my invention a metal ring 21 of uniform width and thickness is mounted on the inner side of the wheel in or close to the plane a—b, as clearly shown in Fig. 2, and in concentric relation to the felly 11. Lugs 22 spot welded or otherwise suitably secured to the ring 21 in equally circumferentially spaced relation serve to support the ring 21 in the position stated, by being spot welded or otherwise suitably secured to the flange 15 of the disk 12. A lead weight 23 is indicated mounted on the inner side of the ring 21 by means of a U-shaped spring clip 24, one arm of which is imbedded in the lead weight and the other arm of which projects into the annular space 25 between the ring 21 and felly 11. The clip 24 preferably has frictional engagement with the felly 11 so that when the weight 24 tends to move radially outwardly under centrifugal force in the turning of the wheel there will be no flexing of the ring 21. The frictional engagement between the clip 24 and the felly added to the frictional engagement between the clip 24 and the ring 21 is enough to keep the weight in place without other means of fastening the same, while also making it a simple matter to adjust the weight in either direction circumferentially of the ring and wheel as may be required in obtaining correct static balance. Due to the fact that the weight 23 is in or near the plane a—b through the middle of the tire tread 20, there is no moment requiring counterbalancing for correct dynamic balance; a wheel placed in correct static balance with the present invention is automatically in correct dynamic balance. It goes without saying that with this balancing means the work and time involved in correctly balancing a wheel, therefore, is reduced to a minimum. The balancing means of my invention is furthermore of advantage from the standpoint that there is nothing exposed to detract from the appearance of the wheel and nothing that is at all apt to be thrown off and lost.

In Figs. 4 and 5 the ring 21a corresponds to the ring 21 in Fig. 1, but is spaced farther radially inwardly from the felly 11a of the wheel 10a so that the weight 23a may be entered between the ring and felly with a close friction fit, the weight being of arcuate form to fit in the annular space 25a, as shown. The U-shaped spring clip 24a has one arm thereof imbedded in the lead body of the weight 23a and the other arm engaging the inner side of the ring 21a, as shown. It is understood, of course, that the ring 21a and weight 23a are disposed in or as close as possible to the plane a—b through the middle of the tire tread 20, as in the construction previously described, in order to obtain the same or similar advantages.

In Fig. 7 a ring 21b is illustrated perforated at regularlyl spaced intervals, as indicated at 26, to receive a screw 27 threading into the balancing weight 23b. The weight 23b is entered into the annular space 25a between the ring 21b and felly 11a on the wheel 10b and the ring and weight are disposed partly in the plane a—b through the middle of the tire tread. With this construction the holes 26 are close enough together to permit close enough balancing and if the screws 27 are of the self-tapping type, it is obvious that the weight 23b may be adjusted to the desired position for correct balance and then a hole drilled therein in register with one of the holes 26 to receive the screw 27, without necessitating a tapping operation. The ring 21b is shown as secured in place like the rings 21 and 21a, namely, by means of lugs 22 spot welded to the ring and felly.

While the rings 21, 21a, and 21b were designed for application to existing wheels, it should be clear that annular flanges may be provided integral with the peripheral flange portion of the wheel disk, as shown at 21c in Fig. 6, 21d in Fig. 8, and 21e in Fig. 9. In these figures the wheel disk is indicated at 12a and the peripheral flange portion at 15a on the wheels 10c, 10d, and 10e. In Figures 6 and 8 it is understood that the flanges 21c and 21d take the place of a separate ring like the ring 21, 21a or 21b. In Fig. 6 the flange 21c is unperforated, the balancing weight 23c being similar to that shown at 23a and entered between the flange 21c and felly 11a and retained by the U-shaped spring clip 24c. In Fig. 8 the flange 21d has holes 26 therein and the weight 23d is entered between the flange and felly and secured in place by means of a screw 27, similarly as in Fig. 7. In both cases the flange is in the plane a—b through the middle of the tire tread and the balancing weight applied thereto lies also in that plane. It is obvious that the flanges 21c and 21d may, if desired, be provided so that the plane a—b is in the middle of these flanges and accordingly extends through the middle of the balancing weights applied thereto. In Fig. 9 the flange 21e is integral with the flange 15a and lies in the plane a—b, and the weight or weights, of which one is shown at 23e, are forked to straddle the flange, with the plane a—b passing through the middle thereof. The weights 23e are fastened to the flange 21e by set screws 27a.

In the drawing I have for convenience shown only one balancing weight in each instance, but, as indicated in dotted lines at 23 in Fig. 1, more than one balancing weight may be used, as, for example, where the weights are not available in a sufficient variety of sizes to permit of correctly balancing the wheel with a single weight of a given size.

It is believed the foregoing description conveys a good understanding of the objects and advantages of my invention. The appended claims have been drawn to cover all legitimate modifications and adaptations.

I claim:

1. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising a complete ring of smaller diameter than the rim portion and rigid with the wheel in truly concentric relation with said rim portion substantially in the plane through the middle of the tire tread, said ring being of uniform size and weight throughout its circumference and being in fixed, uniform, radially spaced relation to said wheel hub throughout its circumference, whereby said ring is in balanced relation to said wheel, and a wheel balancing weight slidably adjustably mounted on the ring externally thereof for infinite adjustment to any position throughout 360°.

2. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising a complete ring of smaller diameter than the rim portion and mounted on the wheel in rigid truly concentric relation with said rim portion substantially in the plane through the middle of the tire tread, said ring being of uniform size and weight throughout its circumference and being in fixed, uniform, radially spaced relation to said rim portion throughout its circumference, whereby said ring is in balanced relation to said wheel, and a wheel balancing weight adjustable slidably circumferentially infinitely throughout 360° with respect to the ring externally thereof and adapted to be held thereon in a position so that the wheel is in static and dynamic balance, the weight having at least a portion thereof disposed in the space between the ring and the rim portion of said wheel.

3. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion rotatable with the wheel in concentric relation with said rim portion substantially in the plane through the middle of the tire tread, and a wheel balancing weight adjustable circumferentially with respect to said annulus and adapted to be held thereon in a position so that the wheel is in static and dynamic balance, each weight having a generally U-shaped clip frictionally engageable on the annulus with the weight disposed on the radially inner side of the annulus and one arm of the clip disposed on the radially outer side of the annulus.

4. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion rotatable with the wheel in concentric relation with said rim portion substantially in the plane through the middle of the tire tread, and a wheel balancing weight of arcuate form to fit between the radially outer side of the annulus and the radially inner side of the rim portion and adjustable circumferentially with respect to said rim and annulus to a position giving static and dynamic balance to the wheel.

5. The combination in a vehicle wheel comprising an annuluar rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion rotatable with the wheel in concentric relation with said rim portion substantially in the plane through the middle of the tire tread, and a wheel balancing weight of arcuate form to fit between the radially outer side of the annulus and the radially inner side of the rim portion and adjustable circumferentially with respect to said rim and annulus to a position giving static and dynamic balance to the wheel, said weight having a generally U-shaped clip for securing the same in adjusted position with respect to the annulus, the clip frictionally engaging said annulus.

6. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion rotatable with the wheel in concentric relation with said rim portion substantially in the plane through the middle of the tire tread, and a wheel balancing weight of arcuate form to fit between the radially outer side of the annulus and the radially inner side of the rim portion and adjustable circumferentially with respect to said rim and annulus to a position giving static and dynamic balance to the wheel, said annulus having circumferentially spaced holes provided therein and said weight having a screw for fastening the same in adjusted position relative to the annulus entered in a hole registering with the weight.

7. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion formed integral with the outer peripheral portion of said circular portion and disposed in concentric relation with said rim portion substantially in the plane through the middle of the tire tread, and a wheel balancing weight mounted on the annulus.

8. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion formed integral with the outer peripheral portion of said circular portion and disposed in concentric relation with said rim portion substantially in the plane through the middle of the tire tread, and a wheel balancing weight adjustable circumferentially with respect to the annulus and adapted to be held thereby in a position giving static and dynamic balance to the wheel.

9. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion formed integral with the outer peripheral portion of said circular portion and disposed in concentric relation with the said rim portion substantially in the plane through the middle of the tire tread, and a wheel balancing weight of arcuate form to fit between the radially outer side of the annulus and the radially inner side of the rim portion and adjustable circumferentially with respect to said rim and annulus to a position giving static and dynamic balance to the wheel.

10. The combination in a vehicle wheel comprising an annular rim portion adapted to mount a tire thereon and a circular portion for mounting the rim portion on a central wheel hub joined at its outer periphery to the rim portion and disposed on one side of the plane through the middle of the tread of the tire, and balancing means comprising an annulus of smaller diameter than the rim portion formed integral with the outer peripheral portion of said circular portion and disposed in concentric relation with the said rim portion substantially in the plane through the middle of the tire tread, and a wheel balancing weight of arcuate form to fit between the radially outer side of the annulus and the radially inner side of the rim portion and adjustable circumferentially with respect to said rim and annulus to a position giving static and dynamic balance to the wheel, said annulus having circumferentially spaced holes provided therein and said weight having a screw for fastening the same in adjusted position relative to the annulus entered in a hole registering with the weight.

11. The combination in a vehicle wheel comprising an annular rim portion adapted to mount a tire thereon and a circular disk portion for mounting the rim portion on a central wheel hub joined at its outer periphery to the rim portion, and balancing means comprising an annulus of smaller diameter than the rim portion and forming a rigid integral flange extension on the disk portion projecting inwardly behind the disk portion and disposed in truly concentric relation with said rim portion substantially in the plane through the middle of the tire tread, and a wheel balancing weight adjustably mounted on the annulus for adjustment circumferentially thereof.

12. The combination in a vehicle wheel comprising an annular rim portion adapted to mount a tire thereon and a circular disk portion for mounting the rim portion on a central wheel hub joined at its outer periphery to the rim portion, and balancing means comprising an annulus behind said disk portion and of smaller diameter than the rim portion formed integral with the outer peripheral portion of said disk portion and disposed in concentric relation with said rim portion, and a wheel balancing weight mounted on the annulus.

13. The combination in a vehicle wheel comprising an annular rim portion adapted to mount a tire thereon and a circular disk portion for mounting the rim portion on a central wheel hub joined at its outer periphery to the rim portion, and balancing means comprising an annulus behind said disk portion and of smaller diameter than the rim portion formed integral with the outer peripheral portion of said disk portion and disposed in concentric relation with said rim portion substantially in the plane through the middle of the tire tread, and a wheel balancing weight mounted on the annulus.

14. The combination in a vehicle wheel comprising an annular rim portion adapted to mount a tire thereon and a circular disk portion for mounting the rim portion on a central wheel hub joined at its outer periphery to the rim portion, and balancing means comprising an annulus behind said disk portion and of smaller diameter than the rim portion formed integral with the outer peripheral portion of said disk portion and disposed in concentric relation with said rim portion substantially in the plane through the middle of the tire tread, and a wheel balancing weight mounted on the annulus, said annulus and weight being wholly in symmetrical relation to the aforesaid plane.

GERALD R. GRIFFITH.